United States Patent
Li

(12) United States Patent      (10) Patent No.: US 12,067,915 B2
Li      (45) Date of Patent: Aug. 20, 2024

(54) DISPLAY METHOD AND ELECTRONIC DEVICE

(71) Applicant: VIVO MOBILE COMMUNICATION CO., LTD., Guangdong (CN)

(72) Inventor: Lei Li, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/903,778

(22) Filed: Sep. 6, 2022

(65) Prior Publication Data
US 2022/0415228 A1    Dec. 29, 2022

Related U.S. Application Data

(63) Continuation of application No. PCT/CN2021/083911, filed on Mar. 30, 2021.

(30) Foreign Application Priority Data

Apr. 3, 2020   (CN) .......................... 202010260738.7

(51) Int. Cl.
     *G09G 3/00*      (2006.01)

(52) U.S. Cl.
     CPC ..... *G09G 3/035* (2020.08); *G09G 2340/0464* (2013.01); *G09G 2354/00* (2013.01)

(58) Field of Classification Search
     CPC ........... G09G 3/035; G09G 2340/0464; G09G 2354/00; G09G 2380/02; G06F 1/1624; G06F 1/1652; G06F 3/04817; G06F 3/0486; G06F 3/04886; G06F 9/451; G06F 3/0416; G06F 2203/04102

See application file for complete search history.

(56) References Cited

U.S. PATENT DOCUMENTS

| | | | | | |
|---|---|---|---|---|---|
| 5,422,993 | A | * | 6/1995 | Fleming | G06F 3/04817 715/835 |
| 2006/0022955 | A1 | * | 2/2006 | Kennedy | G06F 3/0414 345/173 |
| 2013/0201208 | A1 | * | 8/2013 | Cho | G06F 3/0488 345/619 |
| 2013/0234951 | A1 | * | 9/2013 | Kim | G06F 3/0481 345/173 |

(Continued)

FOREIGN PATENT DOCUMENTS

| CN | 101436113 A | 5/2009 |
|---|---|---|
| CN | 106201055 A | 12/2016 |

(Continued)

OTHER PUBLICATIONS

CN First Office Action dated Jan. 20, 2021 as received in Application No. 202010260738.7.
(Continued)

*Primary Examiner* — Ricardo Osorio
(74) *Attorney, Agent, or Firm* — Price Heneveld, LLP

(57) ABSTRACT

The embodiments of the present disclosure disclose a display method and an electronic device. The method includes: receiving a first input; controlling a screen to extend or retract and display candidate items in response to the first input; and displaying a target interface corresponding to a target candidate item in the candidate items in a case that the target candidate item meets a preset condition.

6 Claims, 5 Drawing Sheets

(56) References Cited

U.S. PATENT DOCUMENTS

| | | | |
|---|---|---|---|
| 2014/0204037 A1* | 7/2014 | Kim | G06F 3/03 |
| | | | 345/173 |
| 2014/0247229 A1* | 9/2014 | Cho | G06F 1/1652 |
| | | | 345/173 |
| 2014/0313139 A1* | 10/2014 | Cho | G06F 3/03 |
| | | | 345/173 |
| 2016/0249971 A1 | 9/2016 | Manwaring et al. | |
| 2016/0349971 A1* | 12/2016 | Chi | G09G 5/373 |
| 2016/0373654 A1* | 12/2016 | Kwon | G09G 5/373 |
| 2017/0061932 A1 | 3/2017 | Kwon et al. | |
| 2017/0255357 A1 | 9/2017 | Judd | |
| 2018/0137840 A1 | 5/2018 | Nemoto et al. | |
| 2018/0374452 A1 | 12/2018 | Choi et al. | |
| 2020/0004298 A1 | 1/2020 | Li et al. | |
| 2020/0090582 A1 | 3/2020 | Xue | |
| 2020/0128124 A1 | 4/2020 | Lin et al. | |

FOREIGN PATENT DOCUMENTS

| | | | | |
|---|---|---|---|---|
| CN | 106484174 A | 3/2017 | | |
| CN | 107562336 A | 1/2018 | | |
| CN | 109116983 A | 1/2019 | | |
| CN | 109325336 A | 2/2019 | | |
| CN | 106648382 B * | 3/2019 | | G06F 21/31 |
| CN | 109597551 A | 4/2019 | | |
| CN | 109725773 A | 5/2019 | | |
| CN | 109976657 A | 7/2019 | | |
| CN | 110764575 A | 2/2020 | | |
| CN | 111459367 A | 7/2020 | | |
| EP | 3115989 A1 * | 1/2017 | | G06F 1/1652 |
| EP | 3098802 B1 * | 8/2018 | | G06F 1/1652 |
| JP | 2009-123208 A | 6/2009 | | |
| JP | 2018-084790 A | 5/2018 | | |

OTHER PUBLICATIONS

Written Opinion of the International Searching Authority dated Jul. 5, 2021 as received in Application No. PCT/CN2021/083911.
CN Second Office Action dated Oct. 18, 2021 as received in Application No. 202010260738.7.
CN Third Office Action dated Dec. 28, 2021 as received in Application No. 202010260738.7.
Extended European Search Report dated Sep. 15, 2023 as received in Application No. 21779177.1.
JP Office Action dated Nov. 21, 2023 as received in Application No. 2022-55975.

* cited by examiner

DISPLAY METHOD AND ELECTRONIC DEVICE

CROSS-REFERENCE TO RELATED APPLICATIONS

This application is continuation application of PCT International Application No. PCT/CN2021/083911 filed on Mar. 30, 2021, which claims priority to Chinese Patent Application No. 202010260738.7, filed with the China National Intellectual Property Administration on Apr. 3, 2020, which are incorporated in their entireties by reference herein.

TECHNICAL FIELD

The present invention disclosure relates to the field of communication technologies, and in particular, to a display method and an electronic device.

BACKGROUND

With the development and progress of science and technologies, electronic devices become more and more popular, and the functions of electronic devices become more and more diverse. For example, a communication function, a photographing function, a video recording function, and the like, have become necessary functions of electronic devices. A user needs to unlock an electronic device so as to enter a main desktop. Icons of various applications may be displayed on a screen of the electronic device, and a corresponding application may be started after the user operates on a certain icon.

In the prior art, for an electronic device with a screen retractable in length or width, the screen of the electronic device needs to be fully expanded to operate according to contents displayed on the screen. For example, a standby desktop is displayed after the electronic device with a screen retractable in length or width is unlocked. However, current unlocking methods are all based on a password or a gesture set by the user or using fingertip information of the user to finish unlocking. The unlocking methods are undiversified and boring. On the other hand, if the user needs to enter a certain application interface, the user needs to expand the screen first, enter the main desktop after finishing the unlocking, and then click a corresponding icon to enter an application corresponding to the icon. Operations are complicated and user experience is poor.

SUMMARY

Embodiments of the present disclosure provide a method and an electronic device. disclosure According to a first aspect, an embodiment of the present disclosure provides a display method, applied to an electronic device, where the electronic device includes a screen retractable in length or width. The method includes: receiving a first input; controlling the screen to extend or retract and displaying a candidate item in response to the first input; and displaying a target interface corresponding to a target candidate item in the candidate item in a case that the target candidate item meets a preset condition.

According to a second aspect, an embodiment of the present disclosure provides an electronic device. The electronic device includes a receiving module, a responding module, and a first display module. The receiving module is configured to receive a first input. The responding module is configured to control the screen to extend or retract and display a candidate item. The first display module is configured to display a target interface corresponding to a target candidate item in the candidate item in a case that the target candidate item meets a preset condition.

According to a third aspect, an embodiment of the present disclosure provides an electronic device, including a processor, a memory, and a computer program stored in the memory and runnable in the processor. The computer program, when executed by the processor, implements the steps of the display method according to the first aspect.

According to a fourth aspect, an embodiment of the present disclosure provides a computer-readable storage medium, storing a computer program. The computer program, when executed by the processor, implements the steps of the display method according to the first aspect.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings according to such accompanying drawings without creative efforts.

DETAILED DESCRIPTION

Figure 1:
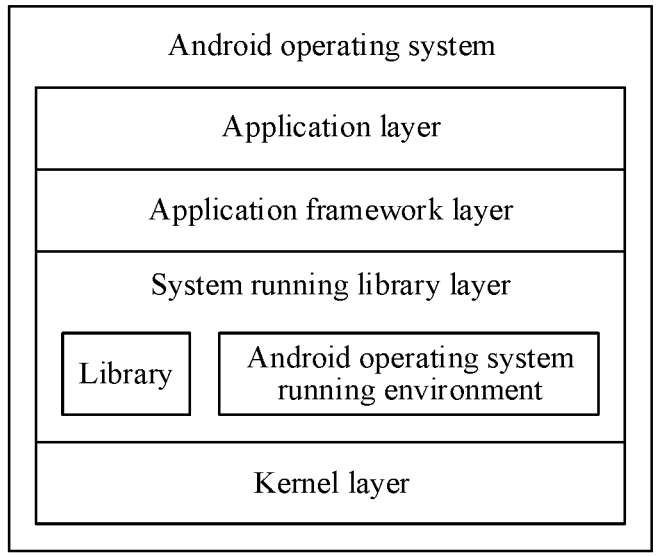
FIG. 1 is a schematic architectural diagram of a possible Android operating system according to an embodiment of the present disclosure.

The following clearly and describes the technical solutions in embodiments of the present disclosure with reference to the accompanying drawings in the embodiments of the present disclosure. Apparently, the described embodiments are some of the embodiments rather than all of the embodiments of the present disclosure. All other embodiments derived by a person of ordinary skill in the art based on the embodiments of the present disclosure without creative efforts shall fall within the protection scope of the present disclosure.

In this specification, the term "and/or" is an associated relationship for describing associated objects, and represents that three relationships may exist. For example, A and/or B may represent the following three cases: Only A exists, both A and B exist, and only B exists. In this specification, the symbol "/" represents an "or" relationship of the associated objects, and for example, AB represents A or B.

The terms such as "first", "second" in the specification and claims of the present disclosure are used for distinguishing different objects and not used for describing a specific sequence of objects. For example, a first region and a second region and the like are used for distinguish different regions and not used for describing a specific sequence of regions.

In addition, in the embodiments of the present disclosure, the term "exemplary" or "for example" is used to represent giving an example, an illustration, or a description. Any embodiment or design scheme described as "exemplary" or "for example" in the embodiments of the present disclosure should not be construed as being superior to other embodiments or design schemes. Exactly, use of the term, such as "exemplarily" or "for example", is intended to present a related concept in a specific manner.

In the descriptions of the embodiments of the present disclosure, unless otherwise stated, the meaning of "a plurality of" refers to two or more. For example, a plurality of elements refer to two or more elements and the like.

The embodiments of the present disclosure provide a display method and an electronic device, where the electronic device includes a screen retractable in length or width. The electronic device may receive a first input; control the screen to extend or retract and display a candidate item in response to the first input; and display a target interface corresponding to a target candidate item in the candidate item in a case that the target candidate item meets a preset condition. Through the solution, on one hand, in a case that a target candidate item is used for unlocking, the target candidate item is obtained, and when the target candidate item matches a preset candidate item, the unlocking is finished, so that the unlocking may be finished during an expansion and retraction process of the screen, which reduces a consumed time for unlocking the electronic device with the screen retractable in length or width, and increases the unlocking fun. On the other hand, in a case that the target candidate item is used for indicating an entry of an application or a shortcut function, after the target candidate item is obtained, an application interface or a shortcut function interface corresponding to the target candidate item may be started, so that a function of entering the application interface during an extension process of the first screen may be implemented, which reduces a consumed time for starting an application of the electronic device with the screen retractable in length or width, and increases the fun, thereby improving user experience.

The electronic device in the embodiments of the present disclosure may be an electronic device including an operating system. The operating system may be an Android operating system or may be an ios operating system or may be another possible operating system. Details are not limited in the embodiments of the present disclosure.

Taking the Android operating system as an example, a software environment to which the display method according to the embodiments of the present disclosure is applied is introduced.

FIG. 1 is a schematic architectural diagram of an Android operating system according to an embodiment of the present disclosure. In FIG. 1, the architecture of the Android operating system includes 4 layers, which are respectively an application layer, an application framework layer, a system running library layer, and a kernel layer (for example a Linux kernel layer).

The application layer includes all applications (including system applications and third-party applications) in the Android operating system.

The application framework layer is a framework for applications. A developer may develop some applications based on the application framework layer in a case of complying with the development principle of the framework for applications.

The system running library layer includes a library (also referred to as a system library) and an Android operating system running environment. The library mainly provides various resources required by the Android operating system. The Android operating system running environment is used for providing a software environment for the Android operating system.

The kernel layer is an operating system layer of the Android operating system, and is a software-level bottom layer of the Android operating system. The kernel layer provides a core system service and a hardware-related driver for the Android operating system based on a Linux kernel.

Taking the Android operating system as an example, in the embodiments of the present disclosure, the developer may develop, based on the system architecture of the Android operating system shown in FIG. 1, a software program that implements the display method according to the embodiments of the present disclosure, so that the display method may be run based on the Android operating system shown in FIG. 1. That is, a processor or the electronic device may implement the display method according to the embodiments of the present disclosure through running the software program in the Android operating system.

The electronic device in the embodiments of the present disclosure may be a mobile terminal device or a non-mobile terminal device. Exemplarily, the mobile terminal device may be a mobile phone, a tablet computer, a notebook computer, a palmtop computer, an in-vehicle terminal, a wearable device, an ultra-mobile personal computer (UMPC), a netbook, a personal digital assistant (PDA) or the like. The non-mobile terminal device may be a personal computer (PC), a television (TV), a teller machine, a self-service machine, or the like. Details are not limited in the embodiments of the present disclosure.

In the prior art, for an electronic device with a screen retractable in length or width, the screen of the electronic device needs to be fully expanded to operate according to contents displayed on the screen. For example, a standby desktop is displayed after the electronic device with a screen retractable in length or width is unlocked. However, current unlocking methods are all based on a password or a gesture set by the user or using fingertip information of the user to finish unlocking. The unlocking methods are undiversified and boring. On the other hand, if the user needs to enter a certain application interface, the user needs to expand the screen first, enter the main desktop after finishing the unlocking, and then click a corresponding icon to enter an application corresponding to the icon. Operations are complicated and user experience is poor.

Therefore, the embodiments of the present disclosure provide a display method. When a user uses an electronic device with a screen retractable in length or width, the screen of the electronic device is controlled to extend or retract, and a candidate item (the candidate item may correspond to a number or a character for unlocking, or correspond to an application icon for quickly starting an application interface) is displayed on the screen. When a target candidate item in the candidate item meets a preset condition, an interface corresponding to the target candidate item is displayed. As a result, when the screen is expanded, unlocking may be implemented or the application interface may be started, which saves operation steps for the user and improves user experience.

To illustrate the embodiments of the present disclosure more clearly, the following are two application scenarios of the display method provided by the present disclosure:

In a first possible scenario, the user hopes that quick unlocking can be implemented when using an electronic device. The user may preset a preset candidate item for matching. There may be one or more preset candidate items, and the contents of the preset candidate items may be numbers, symbols, graphics, figures, and the like (for example, the candidate items set for matching are 1, 2, a square, FIG. 1). The electronic device receives a first input, controls a screen to extend or retract, and displays candidate items on the screen. It should be noted that the candidate items displayed on the screen include contents of the preset candidate items and contents of non-preset candidate items, and a sequence of the candidate items is not limited. In a case that a target candidate item in the candidate items meets a preset condition (for example, receiving an input for the target candidate item by the user), the target candidate item is selected. In a case that there are a plurality of preset candidate items, after selecting the target candidate item, the user can continue to select a second target candidate item (for example, the target candidate item selected by the user for the first time is 1, and the user can continue to select a target candidate item 2). In a case that one or more target candidate items selected by the user match the preset candidate items, unlocking is finished and an unlocked target interface is displayed.

In a second possible scenario, the user wants to quickly enter an application interface or a shortcut function interface when using an electronic device. The electronic device receives a first input, controls a screen to extend or retract, and displays a candidate item on the screen. The candidate item may be an application icon, a shortcut function icon or other identifier corresponding to the application interface. It should be noted that the candidate item displayed on the screen may be contents preset by the user, or may be contents determined by the electronic device according to usage and usage records of the user, or may be all contents displayed on a main desktop of the electronic device. In a case that a target candidate item in the candidate item meets a preset condition (for example, receiving an input for the target candidate item by the user), the target candidate item (such as application icon 1) is selected and the electronic device displays a display interface of an application corresponding to the application icon 1.

The display method according to the embodiments of the present disclosure is exemplarily described below by using an example in which an execution entity is an electronic device.

Figure 2:
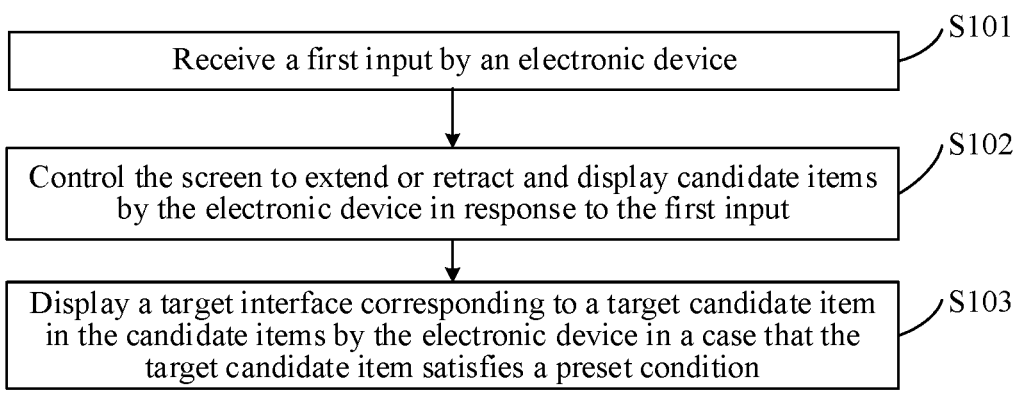
FIG. 2 is a schematic flowchart of a display method according to an embodiment of the present disclosure.

As shown in FIG. 2, an embodiment of the present disclosure provides a display method. The display method may include the following S101 to S103.

S101: An electronic device receives a first input.

Optionally, the first input may be an input for an extension or a retraction of a screen. For example, the user holds an edge of the screen to stretch or push the edge, so that the screen is extended or retracted.

Optionally, the first input may be a touch input for the screen. The electronic device receives the touch input to control the screen to extend or retract. For example, if receiving a slide input from the user, the electronic device controls the screen to extend, and if receiving a click input from the user, the electronic device controls the screen to retract.

Optionally, the first input may be an input for other parts of the electronic device. For example, if detecting an input of shaking to the left, the electronic device controls the screen to extend, and if detecting an input of shaking to the right, the electronic device controls the screen to retract; for example, if detecting an input of flipping the screen upwards, the electronic device controls the screen to extend, and if detecting an input of flipping the screen downwards, the electronic device controls the screen to retract.

Optionally, the first input may further be a notification message, an incoming call, or the like received by the electronic device, and a control operation of the electronic device corresponding to a specific input manner is not limited in this embodiment.

S102: The electronic device controls the screen to extend or retract and displays a candidate item in response to the first input.

In this embodiment of the present disclosure, the candidate item may be displayed on an extended screen region, or may be displayed on a preset screen region.

In this embodiment of the present disclosure, the candidate item may be a character such as a word, a number, or a symbol. The candidate item may alternatively be an image or a graphic. The candidate item may be an application icon, a folder icon, a shortcut function icon, or the like.

Figure 3:
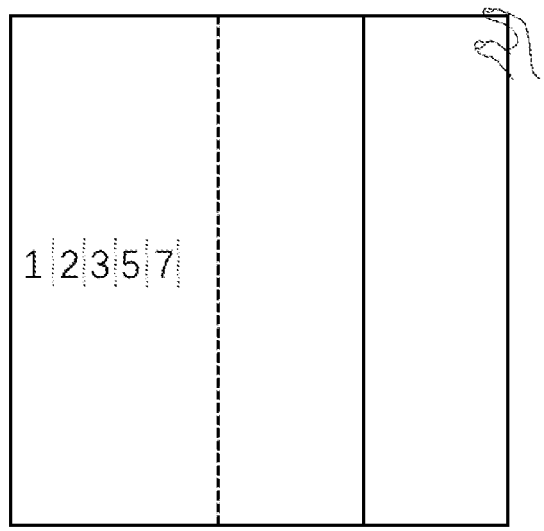
FIG. 3 is a first schematic diagram of an interface to which a display method is applied according to an embodiment of the present disclosure.

For example, an electronic device with a screen retractable in length or width is a mobile phone with a retractable screen as an example. As shown in FIG. 3, a first screen of the mobile phone is controlled to extend, and candidate items are displayed on a second screen of the mobile phone, the candidate items being numbers. If an input for a target number is received, in a case that the target number matches a preset number, an unlocked interface such as a main desktop of the screen is displayed.

Optionally, after the first screen of the mobile phone is controlled to extend, the candidate items are displayed on the second screen of the mobile phone, the candidate items being graphics such as triangles, squares, rectangles, and combined graphics of triangles and squares. If an input for a target graphic is received, in a case that the target graphic matches a preset graphic, the unlocked interface is displayed.

Optionally, after the first screen of the mobile phone is extended, the candidate items are displayed on the second screen of the mobile phone, the candidate items being combinations of graphics and numbers, such as 1, 2, 3, a triangle, a rectangle, 4, 5 . . . . If an input for a target object (a target graphic or a target number) is received, in a case that the target number matches a preset number, the unlocked interface is displayed.

Figure 4:
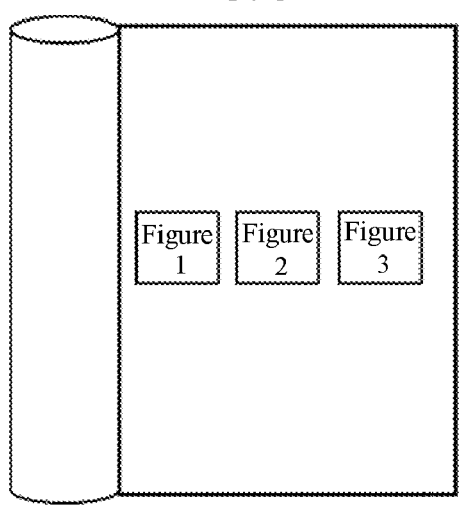
FIG. 4 is a second schematic diagram of an interface to which a display method is applied according to an embodiment of the present disclosure.

In an example, an electronic device with a screen retractable in length or width may be a mobile phone with a flexible screen. As shown in FIG. 4, the screen of the mobile phone is controlled to extend, and candidate items are displayed, where the candidate items may be displayed on an extended region of the screen or may be displayed on parts of the extended region of the screen. The candidate items may be images. If an input for a target image is received, in a case that the target image matches a preset image, the unlocked interface is displayed.

Optionally, in a case that the candidate items are images, if an input for a target image is received, a page corresponding to the target image in an album or a page corresponding to the target image in another system may be displayed.

Optionally, the images may be images preset by the user, or may be images obtained online by a system, or may be images obtained from a phone album by the system. The origin of the images is not limited in this embodiment.

In an example, the candidate items are application icons. If an input for a target icon is received, an application interface corresponding to the target icon is displayed. If the target icon is an application store, a main interface of the application store or a sub-interface of the application store is displayed.

Optionally, the candidate items are shortcut function icons. If an input for a target shortcut function icon is received, a shortcut function interface corresponding to the target shortcut function icon is displayed. If the target shortcut function icon is a payment icon, a payment main page is displayed.

Optionally, the candidate items may be at least one of numbers, graphics, application icons, shortcut function icons, and the like. If an input for a target object (a target number, a target graphic, a target application icon, a target shortcut function icon, and the like) is received, a display interface corresponding to the target object is displayed.

In an example, the number of the candidate items displayed on the second screen may be associated with an extension length of the first screen. For example, when the first screen is extended, the displayed candidate items are updated, and the number of the candidate items increases.

In this embodiment of the present disclosure, specific contents of the foregoing candidate items may be set by the user according to needs. For example, in a case that it is required to implement the unlocking while a screen is expanded, the candidate items may be numbers, characters, graphics, and the like; and in a case that it is required to quickly start an application interface while a screen is expanded, the candidate items may be application icons, shortcut function icons, images, and the like.

S103: The electronic device displays a target interface corresponding to a target candidate item in the candidate item in a case that the target candidate item meets a preset condition.

In this embodiment of the present disclosure, the target interface is associated with the target candidate item, that is, the electronic device displays the target interface corresponding to the target candidate item according to the target candidate item selected by the user. It may be understood that the target interface may not be a fixed interface, that is, corresponding to a same candidate item, the target interface may be different when displayed in different cases.

For example, in an unlocking scenario, the candidate items are set to be graphics, and the preset graphic is a rectangle. When an input for the rectangle is received, an unlocked target interface is displayed, where the target interface may be a main desktop of the electronic device, or may be an application interface displayed before the electronic device is locked.

In another example, in a scenario of starting an application, the candidate items are set to be application icons. If an input for the target application icon is received, a target interface corresponding to the target application icon is displayed, where the target interface may be a main interface of the application corresponding to the target application icon, or may be a background cache page of the application corresponding to the target application icon.

In another example, in a scenario of starting a shortcut function, the candidate items are set to be shortcut function icons. When an input for a target shortcut function icon is received, a target interface corresponding to the target shortcut function icon is displayed, where the target interface may be a main interface of the shortcut function, or may be a target window interface corresponding to the shortcut function. For example, the target shortcut function icon is a payment icon, and the window interface includes a scan interface, a payment code interface, or the like. The electronic device may determine the target window interface according to a historical record or recent usage.

The preset condition may be receiving an input for the candidate items, so as to determine the target candidate item and display the target interface corresponding to the target candidate item. The preset condition may alternatively be displaying the target interface corresponding to the target candidate item after the target candidate item meets the preset condition.

Exemplarily, as shown in FIG. 3, the electronic device receives a first input from the user, such as stretching the edge of the screen to extend the screen. In response to the input, the electronic device controls the screen to extend and display numbers, namely, the candidate items, on the extended region of the screen. The receiving an input for the candidate items may be, as shown in FIG. 3, receiving a click input for numbers by the user on the electronic device. For example, the user clicks a number 3, in a case that a preset number is 3, the electronic device is unlocked and an unlocked main interface is displayed. Therefore, the electronic device can be unlocked during a process of expanding the screen.

Optionally, in an unlocking scenario, after a target candidate item (which may be considered as a first candidate item here) is selected, an input by the user can be received continuously, and a target candidate item (which may be considered as a second candidate item here) can be selected continuously. In a case that a combination of the first candidate item and the second candidate item matches the preset candidate item, the unlocked interface is displayed. The number of the candidate items set in the unlocking scenario is not limited in this embodiment.

Optionally, as shown in FIG. 3, after the target candidate item is selected, the target candidate item may be displayed on a preset region of the screen to prompt the user selected contents.

Optionally, after the target candidate item is selected, the target candidate item may be displayed on a preset region of the screen, and may be hid after a preset time to protect privacy of the user. A hiding manner may be canceling displaying or may be displaying in a second form.

Optionally, in an unlocking scenario, when the number of the candidate items is set to be less than two, after the target candidate item is selected, an input by the user may be received and the selected target candidate item may be deleted, so that the user may re-input after making a wrong selection.

Figure 5:
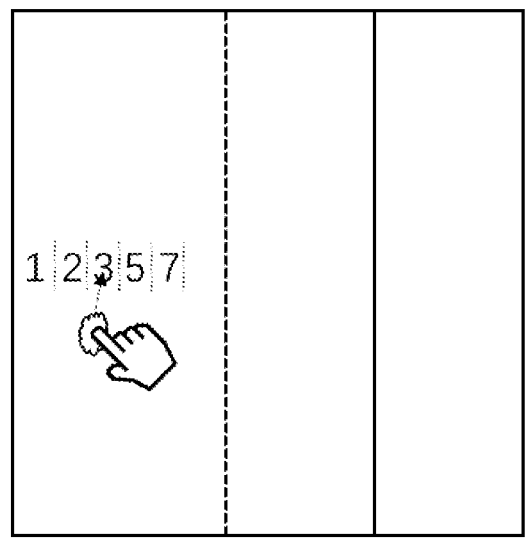
FIG. 5 is a third schematic diagram of an interface to which a display method is applied according to an embodiment of the present disclosure.

Exemplarily, the electronic device receives a first input by the user, such as stretching the edge of the screen to extend the screen. In response to the input, the electronic device controls the screen to extend, displays numbers, namely, the candidate items, on the extended region of the screen, and displays a target identifier. That the target candidate item meets a preset condition may be, as shown in FIG. 5, after the electronic device receives a drag input for the target identifier by the user, the target interface is displayed in a case that the target identifier at least partially overlaps the target candidate item. For example, the electronic device displays numbers, namely, the candidate items, and if the user drags the target identifier, in a case that the target identifier at least partially overlaps a number 3, the number 3 can be considered to be selected. In a case that a preset number is 3, the electronic device is unlocked, and the unlocked interface is displayed.

Exemplarily, before the electronic device receives the first input from a user, the electronic device displays a target identifier on a first position of a screen. The electronic device receives the first input by the user. In response to the input, the electronic device controls the screen to extend, displays application icons, namely candidate items, on the screen, and displays the target identifier on a second position. That the target candidate item meets a preset condition may be that in a case that the target identifier overlaps a target application icon, a display interface corresponding to the target application icon is displayed. For example, the electronic device displays the target identifier on the edge of the screen, and the electronic device receives an input of clicking a control indicating the screen to extend by the user on a touch screen, controls the screen to extend, and displays the application icons on the extended region of the screen, and the target identifier is moved to the second position. In a case that the target identifier overlaps a target application icon, a display interface corresponding to the target application icon is displayed.

Optionally, that the target identifier at least partially overlaps the target candidate item may be that a first region where the target identifier is located at least partially overlaps a second region where the target candidate item is located.

In an embodiment of the present disclosure, an electronic device includes a screen retractable in length or width, and may receive a first input; control the screen to extend or retract and display candidate items in response to the first input; and display a target interface corresponding to a target candidate item in the candidate items in a case that the target candidate item meets a preset condition. Through the solution, on one hand, in a case that a target candidate item is used for unlocking, the unlocking may be finished through obtaining the target candidate item and a preset candidate item, so that the unlocking may be finished during an expansion and retraction process of the screen, which reduces a consumed time for unlocking the electronic device with the screen retractable in length or width, and increases the unlocking fun. On the other hand, in a case that the target candidate item is used for indicating an entry of an application or a shortcut function, after the target candidate item is obtained, an application interface or a shortcut function interface corresponding to the target candidate item may be started, so that a function of entering the application interface during an extension process of the first screen may be implemented, which reduces a consumed time for starting an application of the electronic device with the screen retractable in length or width, and increases the fun, thereby improving user experience.

Exemplarily, before step 103, the method further includes the following step 104:

Step 104: The electronic device displays a target identifier.

The target identifier may be a graphic, a control, a mask, a selection box, or the like. A specific form of the target identifier is not limited in this embodiment.

The displaying a target identifier may be that a target identifier is displayed before the electronic device receives the first input, or may be that a target identifier is displayed after the electronic device receives the first input.

In a first possible implementation, exemplarily, the electronic device is an electronic device with a retractable screen, where a second screen is a retractable screen, and a target identifier is displayed on a first screen before the electronic device receives the first input. After receiving the first input, the electronic device controls the second screen to extend, and displays a candidate item on the first screen. An input for the target identifier may be received, a target candidate item may be selected through the target identifier, and a target interface corresponding to the target candidate item may be displayed.

Optionally, that a target candidate item may be selected through the target identifier may be that, the target identifier is clicked first and then the candidate items are clicked to determine the target candidate item, or may be that an input for the target identifier is received to move the target identifier, and the target candidate item is determined in a case that the target identifier at least partially overlaps the candidate items. A manner of that a target candidate item may be selected through the target identifier is not limited in this embodiment.

In a second possible implementation, exemplarily, the electronic device is an electronic device with a scrolling screen. After receiving a first input, the electronic device controls the screen to extend, displays candidate items on the extended region of the screen, and displays a target identifier. An input for the target identifier may be received, a target candidate item may be selected through the target identifier, and a target interface corresponding to the target candidate item may be displayed.

It is to be noted that, after the electronic device receives the first input, the target identifier and the candidate items may be displayed simultaneously, or the target identifier may be displayed first and then the candidate items may be displayed, or the candidate items may be displayed first and then the target identifier may be displayed. A sequence of displaying the target identifier and the candidate items after the electronic device receives the first input is not limited in this embodiment of the present disclosure.

Exemplarily, step 103 may specifically include the following step 103a:

Step 103a: The electronic device displays the target interface corresponding to the target candidate item in the candidate item in a case that the target identifier at least partially overlaps the target candidate item.

It is to be noted that, that the target identifier at least partially overlaps the target candidate item may be that a partial region where the target identifier is located at least partially overlaps a target region where the target candidate item is located, which is not limited in this embodiment of the present disclosure.

Exemplarily, the electronic device displays the candidate item and the target identifier on the screen. The electronic device may receive an input for the target identifier, cause the target identifier to move, and display the interface corresponding to the target candidate item in a case that the target identifier at least partially overlaps the target candidate item in the candidate item.

Figure 6:
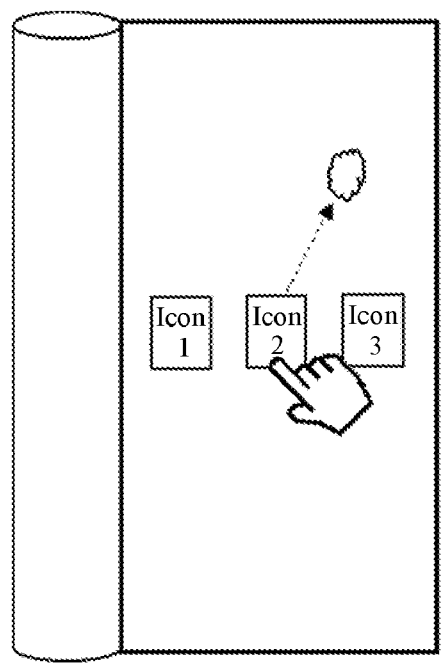
FIG. 6 is a fourth schematic diagram of an interface to which a display method is applied according to an embodiment of the present disclosure.

Exemplarily, as shown in FIG. 6, the electronic device displays the candidate items and the target identifier on the screen. The electronic device may receive an input for the target candidate item in the candidate items, cause the target candidate item in the candidate items to move, and display the interface corresponding to the target candidate item in a case that the target identifier at least partially overlaps the target candidate item in the candidate items.

Optionally, an overlapping area threshold of the target identifier and the target candidate item may be set. In a case that an overlapping area of the target identifier and the target candidate item is greater than a preset value, the target interface corresponding to the target candidate item is displayed. For example, it is set that in a case that the target identifier completely overlaps the target candidate item, the target interface corresponding to the target candidate item is displayed.

In the display method provided by this embodiment of the present disclosure, the target identifier is added, and the target interface corresponding to the target candidate item is displayed in a case that the target identifier at least partially overlaps the target candidate item. In the method of this embodiment of the present disclosure, the target interface corresponding to the target candidate item can be only in a case that the target identifier at least partially overlaps the target candidate item, which reduces the possibility of misoperation in use by the user and improves the user experience.

Exemplarily, step 104 may specifically include the following step 104a, step 104a being performed before step 102:

Step 104a: The electronic device displays the target identifier on a first position of the screen.

In this embodiment of the present disclosure, the foregoing first position may be a position preset by the user, or may be a position randomly selected by a system of the electronic device.

Exemplarily, the electronic device includes a first screen and a second screen, where the second screen is a retractable screen. The displaying the target identifier on a first position of the screen may be displaying the target identifier on a central region of the first screen, or may be displaying the target identifier on a region randomly selected by the system such as an edge region of the screen.

Exemplarily, step 102 may specifically include the following step 102a:

Step 102a: The electronic device controls the screen to extend or retract, displays the candidate items, and displays the target identifier on a second position of the screen, where the first position and the second position are different.

In this embodiment of the present disclosure, the second position is related to the extension or retraction of the screen.

Exemplarily, the second position is related to an extension or retraction length of the screen. The electronic device receives a first input, and controls the screen to extend. If the extension length of the screen is a first length, a second position may be a position that is the first length away from the first position along an extension direction of the screen, or may be a position that is the first length away from the first position along a direction opposite to the extension direction of the screen.

Optionally, a distance between the second position and the first position and the extension length of the screen may have a preset proportion relationship. If a preset proportion is 2:1, in a case that the extension length of the screen is the first length, the second position may be a position that is two times the first length away from the first position along the extension direction of the screen.

A correspondence between the second position and the extension or retraction length of the screen is not limited in this embodiment.

Figure 7:
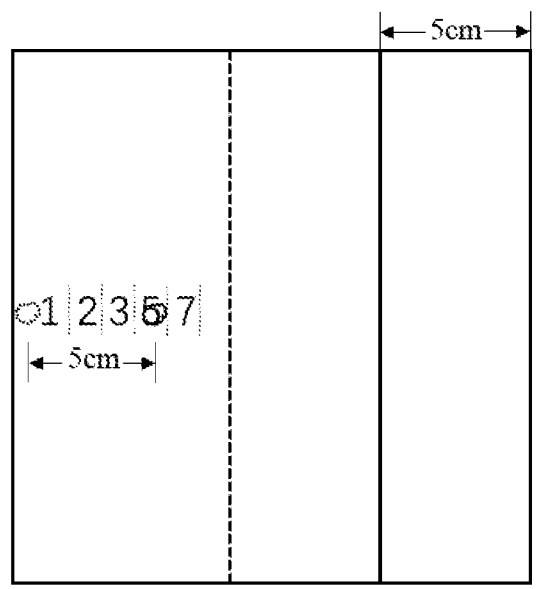
FIG. 7 is a fifth schematic diagram of an interface to which a display method is applied according to an embodiment of the present disclosure.

For example, with reference to FIG. 7, an electronic device with a first screen and a second screen is used as an example, where the second screen is retractable. A target identifier is displayed on an edge region on the first screen. The electronic device receives a first input from the user, controls the second screen to extend 5 cm, displays application icons, and displays the target identifier at a position (the second position in the figure) 5 cm away from the edge region. In this case, the target identifier overlaps the target application icon, and the electronic device displays an application interface corresponding to the target application icon.

Exemplarily, the second position is related to a time used for extension or retraction by the screen. A movement speed is preset to be v. The electronic device receives the first input, and controls the screen to extend. If the time used by the screen to extend by a first preset length is t, the second position may be a position that is $t*v$ away from the first position along the extension direction of the screen.

Optionally, when calculating the distance between the second position and the first position, an average speed $v2$ at which the screen extends by a second preset length may be selected, and the second position may be a position that is $t*v2$ away from the first position along the extension direction of the screen.

A correspondence between the second position and the extension or retraction time of the screen is not limited in this embodiment.

For example, an electronic device with a first screen and a second screen is used as an example, where the second screen is retractable. A target identifier is displayed on an edge region on the first screen. The electronic device receives a first input from the user, controls the second screen to extend, and displays application icons, where a preset length is 5 cm, a preset speed is 1 cm/s, and the time used by the second screen to extend 5 cm is 2 s, and the target identifier is displayed at a position 2 cm away from the edge region. In this case, the target identifier overlaps the target application icon, and the electronic device displays an application interface corresponding to the target application icon.

In the display method provided by this embodiment of the present disclosure, during a process of controlling the screen to extend or retract, a position of the target identifier is changed, and a display interface corresponding to the target candidate item is displayed in a case that the target identifier at least partially overlaps the target candidate item. In the method provided by the embodiments of the present disclosure, the position of the target identifier is triggered to change by the extension or retraction of the screen without requiring the user to manually change the position of the target identifier, which reduces operation steps for starting the target interface and facilitates use by the user.

Exemplarily, step 102 may specifically include the following step 102b:

Step 102b: The electronic device controls the screen to extend and display a first candidate item; and display a second candidate item in a case that the extension length of the screen is greater than a first preset value.

In this embodiment, the first candidate item and the second candidate item are different, where the first candidate item and the second candidate item may be partially different, or may be totally different in contents, which is not limited in this embodiment.

Exemplarily, the contents of the first candidate item and the contents of the second candidate item are partially different, that is, the contents of the candidate items are partially updated after the extension length of the screen is greater than a first preset value. For example, after the screen is controlled to extend, the first candidate item is displayed, and the contents of the candidate items are icon 1, icon 2, icon 3, and icon 4. The first preset value is 3 cm. When the extension length of the screen is greater than 3 cm, the second candidate item is displayed and the contents of the candidate items are icon 2, icon 3, icon 4, and icon 5.

Exemplarily, the contents of the first candidate item and the contents of the second candidate item are totally different, that is, the contents of the candidate items are totally updated after the extension length of the screen is greater than a second preset value. For example, after the screen is controlled to extend, the first candidate item is displayed, and the contents of the candidate items are icon 1, icon 2, icon 3, and icon 4. The first preset value is 3 cm. When the extension length of the screen is greater than 3 cm, the second candidate item is displayed and the contents of the first candidate item are icon 5, icon 6, and icon 7.

Exemplarily, step 103 may specifically include the following step 103b:

Step 103b: The electronic device displays the target interface corresponding to the target candidate item in a case that a duration during which a length of the screen remains unchanged is greater than a second preset value, where the target candidate item is a candidate item added to the second candidate item compared to the first candidate item.

In this embodiment, the duration during which a length of the screen remains unchanged is a duration during which no first input is received, and the candidate item added to the second candidate item compared to the first candidate item may be one or more.

Exemplarily, if there is one candidate item added to the second candidate item compared to the first candidate item, the added candidate item is the target candidate item, and an interface corresponding to the target candidate item is displayed in a case that the duration during which a length of the screen remains unchanged is greater than the second preset value.

Exemplarily, in an unlocking scenario, if there are a plurality of candidate items added, the plurality of candidate items are compared with the preset candidate items, and if the plurality of candidate items match the preset candidate items, the unlocked interface is displayed.

Optionally, the plurality of candidate items are not distinguished in sequence, that is, unlocking can be implemented as long as the contents of the candidate items correspond to the preset candidate items. For example, the second preset value is 2 s, and the preset candidate items are 7, 3, 5, and 1. The electronic device receives the first input, and the first candidate items displayed are 2, 4, and 6. In a case that the duration during which the screen of the electronic device remains unchanged is greater than 2 s, the contents of the second candidate items displayed are 1, 2, 3, 4, 5, 6, and 7, and the contents added to the second candidate item compared to the first candidate item are 1, 3, 5, and 7. In this case, there is a correspondence between the added candidate items and the preset candidate items, so that the electronic device is unlocked successfully and the unlocked interface is displayed.

Optionally, in a case that there are a plurality of candidate items added to the second candidate item compared to the first candidate item, the sequence of the candidate items may be determined according to a preset direction. For example, the second preset value is 2 s, the preset candidate items are 7, 3, 5, and 1, and the preset direction is the extension direction of the screen. The electronic device receives the first input, and the first candidate items displayed are 2, 4, and 6. In a case that the duration during which the screen of the electronic device remains unchanged is greater than 2 s, the contents of the second candidate items displayed are 1, 2, 3, 4, 5, 6, and 7 along the extension direction of the screen, and the contents added to the second candidate item compared to the first candidate item are 1, 3, 5, and 7. In this case, the added candidate items do not match the preset candidate items, so that the electronic device fails to unlock.

Exemplarily, in a case of displaying the application interface, if there are a plurality of candidate items added, the target interfaces corresponding to the target candidate items are displayed in a split-screen manner.

For example, in a case that there are a plurality of candidate items added to the second candidate item compared to the first candidate item, the second preset value is 2 s. The electronic device receives the first input, and the first candidate items displayed are icon 1 and icon 2. In a case that the duration during which the screen of the electronic device remains unchanged is greater than 2 s, the contents of the second candidate items displayed are icon 3 and icon 4, and the contents added to the second candidate items compared to the first candidate items are icon 3 and icon 4. In this case, the screen is split into two parts to respectively display target application interfaces corresponding to icon 3 and icon 4.

In this embodiment, in a case that the screen of the electronic device meets a certain condition, the contents of the candidate items may be updated, so that when the candidate items displayed on the screen do not include candidate items needed by a user, the displayed candidate items may be updated until the candidate items needed by the user are displayed, thereby improving user experience.

Exemplarily, the electronic device includes the first screen and the second screen, and step 102 may specifically include the following 102c:

Step 102c: The electronic device controls the second screen to extend or retract, and displays the candidate items on the first screen and moves the candidate items on the first screen, where a movement distance of the candidate items is related to an extension length or a retraction length of the second screen.

In this embodiment, the second screen is a retractable screen. It is to be noted that, in this embodiment, the first screen and the second screen may both be rigid screens, or may both be flexible screens, or may be one flexible screen and one rigid screen, which is not limited in this embodiment.

In this embodiment, the second screen may be controlled to extend or retract, and the candidate items may be displayed and moved on the first screen. Alternatively, the candidate items may be displayed on the first screen first, and then the candidate items may be moved after controlling the second screen to extend or retract. Alternatively, the second screen may be controlled to extend or retract after the first input is received, and the candidate items may be displayed and moved simultaneously. A sequence of extending or retracting the second screen and displaying the candidate items is not limited in this embodiment.

In this embodiment, the second screen may be extended or retracted, where the movement distance of the candidate item is related to the extension length or retraction length of the second screen. In a case that the second screen is extended, the candidate items may be moved along the extension direction of the screen, and in a case that the second screen is retracted, the candidate items may be moved along the retraction direction of the screen. Alternatively, in a case that the second screen is extended, the candidate items may be moved along a direction opposite the extension direction of the screen, and in a case that the second screen is retracted, the candidate items may be moved along a direction opposite the retraction direction of the screen. A movement direction of the candidate items is not limited in this embodiment.

In this embodiment, the movement distance of the candidate items is related to the extension length or the retraction length of the second screen. The movement distance of the candidate items may be equal to the extension length or the retraction length of the second screen. Alternatively, there may be a proportion of the movement distance of the candidate items to the extension length or the retraction length of the second screen.

For example, the electronic device receives a first input, and controls the second screen to extend. The candidate items are displayed on the edge on the first screen. If an obtained extension length of the second screen is 3 cm, the candidate items are moved by 3 cm along the extension direction of the second screen.

Optionally, the electronic device receives a first input, and controls the second screen to extend. The candidate items are displayed and moved on the first screen, where an extension speed of the second screen and a movement speed of the candidate items are the same.

For example, a preset proportion is set to be 2:1. The electronic device receives a first input, and controls the second screen to extend. The candidate items are displayed on the edge of the first screen. If an obtained extension length of the second screen is 3 cm, the candidate items are moved by 1.5 cm along the extension direction of the second screen.

Optionally, a preset proportion is set to be 2:1. The electronic device receives a first input, and controls the second screen to extend. The candidate items are displayed and moved on the first screen. If an extension speed of the second screen is 2 cm/s, and a movement speed of the candidate items is 1 cm/s.

Exemplarily, the electronic device includes a first screen and a second screen, and step 103 may specifically include the following step 103c:

Step 103c: The electronic device displays a target interface corresponding to the target candidate item in the candidate items in a case that the target candidate item at least partially overlaps a target region of the first screen.

In this embodiment, the target region may be a preset region, or may be a region determined by the user through a touch input on the screen after the candidate items are displayed. The shape of the target region may be any shape, such as a square and a circle, and the size of the target region may be made according to needs of the user.

Figure 8:
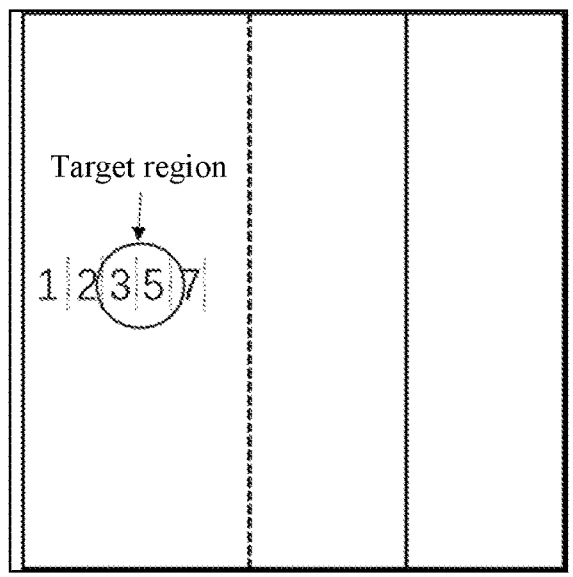
FIG. 8 is a sixth schematic diagram of an interface to which a display method is applied according to an embodiment of the present disclosure.

Exemplarily, as shown in FIG. 8, the preset region is a circular region located on the first screen. The electronic device receives the first input, and controls the second screen to extend. The candidate items are displayed on the first screen and moved along the extension direction of the second screen. In a case that the circular region on the central first screen at least partially overlaps the target candidate item, an interface corresponding to the target candidate item is displayed.

Optionally, it may be set that a display interface corresponding to the target candidate item is displayed in a case that an overlapping area of the target candidate item and the target region is greater than a preset value.

Optionally, a preset region may at least partially overlap a plurality of candidate items, that is, there are a plurality of target candidate items. For example, in an unlocking scenario, the preset candidate items are 1, 2 and 3. The electronic device receives a first input, and controls the second screen to extend. Numbers 1, 2, 3, 4, 5, and 6, namely the candidate items, are displayed on the first screen, and the candidate items are moved along an extension direction of the second screen. In a case that the circular region of the central first screen at least partially overlaps 1, 2, and 3, the target candidate items are 1, 2, and 3, and if the target candidate items 1, 2, and 3 match the preset candidate items, the electronic device displays the unlocked interface.

Optionally, in a case that the plurality of target candidate items at least partially overlap a preset region, a sequence of the target candidate items may be determined according to a preset rule.

For example, in a scenario of starting an application interface, the electronic device receives a first input, and controls the second screen to extend. Icon 1, icon 2, icon 3, and icon 4, namely the candidate items, are displayed on the first screen, and the candidate items are moved along an extension direction of the second screen. In a case that the circular region of the central first screen at least partially overlaps icon 1 and icon 2, the target candidate items are icon 1 and icon 2, and the electronic device displays display interfaces corresponding to the icon 1 and the icon 2 in a split-screen manner.

In this embodiment, the electronic device includes a first screen and a second screen, where the second screen is a retractable screen, and candidate items may be moved according to an extension or a retraction of the second screen. In a case that a target region matches a target candidate item, a display interface corresponding to the target candidate item is displayed. By applying the method provided by the embodiment, a plurality of target candidate items may be selected, the use scenarios of the user may be increased, and a quick unlocking may be implemented or a plurality of applications may be started, thereby improving user experience.

It is to be noted that, in the embodiments of the present disclosure, the display methods shown in the foregoing accompany drawings are all illustratively described by taking an accompany drawing in the embodiments of the present disclosure as an example. In a specific implementation, the display methods shown in the foregoing accompany drawings may alternatively be implemented in combination with any other accompany drawings shown in the foregoing embodiments that can be combined, and details are not described herein again.

Figure 9:
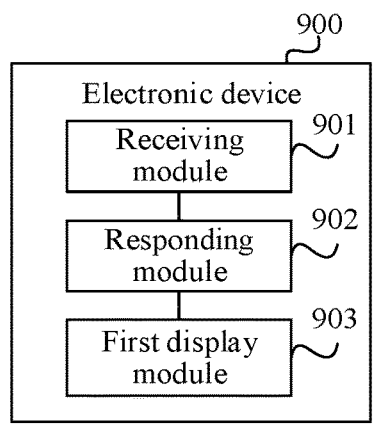
FIG. 9 is a first schematic structural diagram of an electronic device according to an embodiment of the present disclosure.

As shown in FIG. 9, an embodiment of the present disclosure provides an electronic device 900. The electronic device may include a receiving module 901, a responding module 902, and a first display module 903. The receiving module 901 may be configured to receive a first input. The responding module 902 may be configured to control the screen to extend or retract and display candidate items in response to the first input received by the receiving module 901. The first display module 903 may be configured to display a target interface corresponding to a target candidate item in the candidate items in a case that the target candidate item meets a preset condition.

Figure 10:
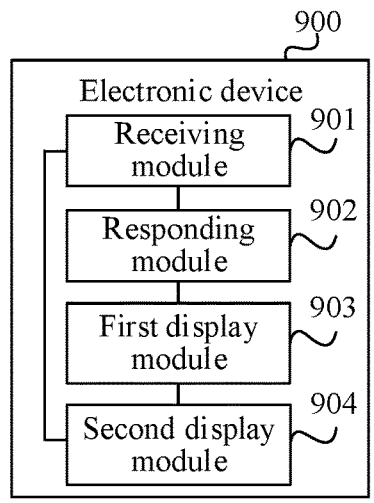
FIG. 10 is a second schematic structural diagram of an electronic device according to an embodiment of the present disclosure.

Optionally, with reference to FIG. 9, as shown in FIG. 10, the electronic device provided by the embodiments of the present disclosure may further include a second display module 904. The second display module 904 may be configured to display a target identifier. The first display module 903 may further be configured to display the target interface corresponding to the target candidate item in the candidate items in a case that the target identifier at least partially overlaps the target candidate item.

Optionally, the second display module 904 may specifically be configured to display the target identifier on a first position of the screen before the first input is received. The first display module 903 may further be configured to control the screen to extend or retract, display the candidate items, and display the target identifier on a second position of the screen.

The first position and the second position are different.

Optionally, the first display module 903 may further be configured to control the screen to extend and display a first candidate item. The first display module 903 may further be configured to display a second candidate item, in a case that an extension length of the screen is greater than a first preset value. The second display module 904 may further be configured to display the target interface corresponding to the target candidate item in a case that a duration during which a length of the screen remains unchanged is greater than a second preset value, where the target candidate item is a candidate item added to the second candidate item compared to the first candidate item.

Optionally, the electronic device further includes a first screen and a second screen. The first display module 903 is further configured to control the second screen to extend or retract, and display candidate items on the first screen and move the candidate items on the first screen, where a movement distance of the candidate items is related to an extension length or retraction length of the second screen. The second display module 904 is further configured to display a target interface corresponding to the target candidate item in the candidate items in a case that the target candidate item at least partially overlaps a target region of the first screen.

The electronic device provided by this embodiment of the present disclosure can implement various processes implemented by the electronic device in the foregoing method embodiment. To avoid repetition, details are not described herein again.

This embodiment of the present disclosure provides an electronic device. On one hand, in a case that a target candidate item is used for unlocking, the target candidate item is obtained, and when the target candidate item matches a preset candidate item, the unlocking is finished, so that the unlocking may be finished during an expansion and retraction process of the screen, which reduces a consumed time for unlocking the electronic device with the screen retractable in length or width, and increases the unlocking fun. On the other hand, in a case that the target candidate item is used for indicating an entry of an application or a shortcut function, after the target candidate item is obtained, an application interface or a shortcut function interface corresponding to the target candidate item may be started, so that a function of entering the application interface during an extension process of the first screen may be implemented, which reduces a consumed time for starting an application of the electronic device with the screen retractable in length or width, and increases the fun, thereby improving user experience.

Figure 11:
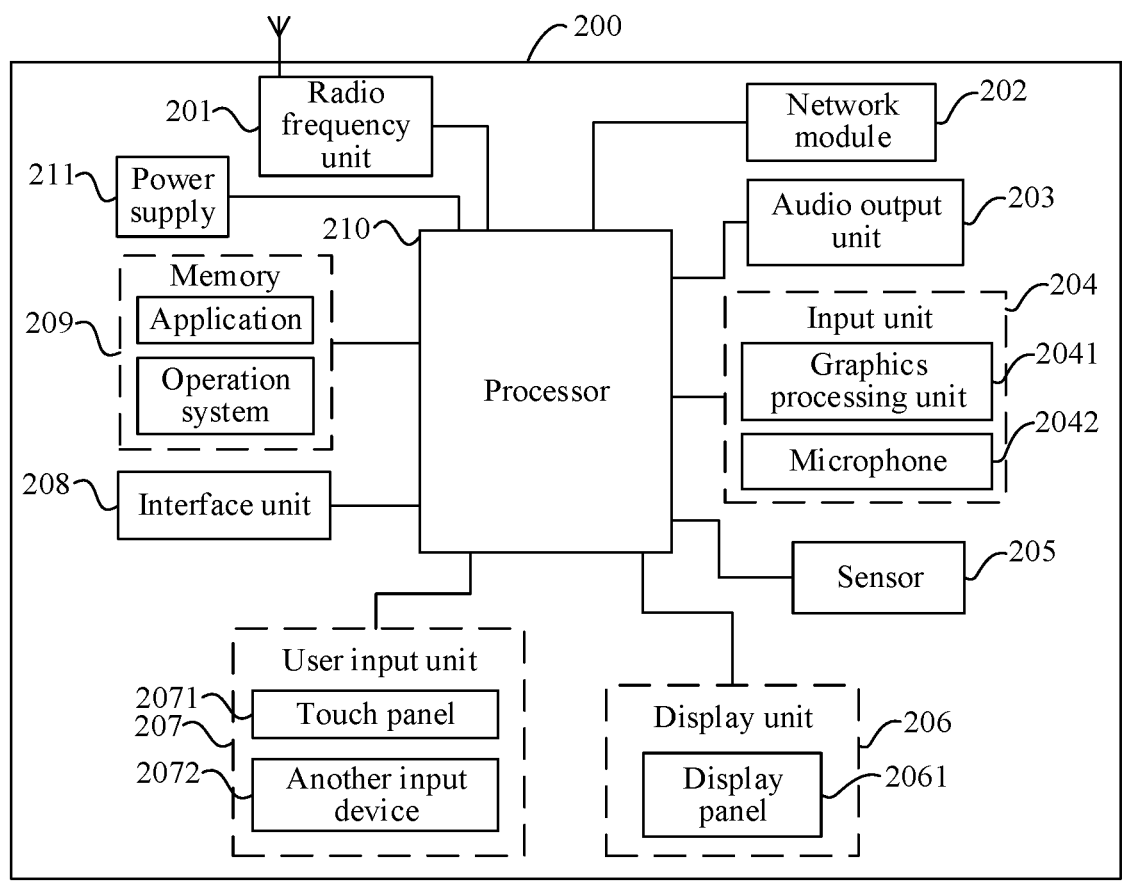
FIG. 11 is a third schematic structural diagram of an electronic device according to an embodiment of the present disclosure.

FIG. 11 is a schematic diagram of a hardware structure of an electronic device that implements the embodiments of the present disclosure. As shown in FIG. 11, the electronic device 200 includes but is not limited to: components such as a radio frequency unit 201, a network module 202, an audio output unit 203, an input unit 204, a sensor 205, a display unit 206, a user input unit 207, an interface unit 208, a memory 209, a processor 210, and a power supply 211. A person skilled in the art may understand that the structure of the electronic device shown in FIG. 11 constitutes no limitation on the electronic device, and the electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palmtop computer, an in-vehicle terminal, a wearable device, a pedometer, or the like.

The processor 210 is configured to receive a first input, and control a screen to extend or retract in response to the first input, and is further configured to control the display unit 206 to display candidate items. In a case that a target candidate item in the candidate items meets a preset condition, the processor 210 is further configured to control the display unit 206 to display a target interface corresponding to the target candidate item.

The processor 210 is further configured to control the display unit 206 to display a target identifier. In a case that the target identifier at least partially overlaps the target candidate item in the candidate items, the processor 210 is further configured to control the display unit 206 to display the target interface corresponding to the target candidate item.

The processor 210 is further configured to control the screen to extend or retract in response to the first input, and control the display unit 206 to display the target identifier on a first position of the screen before the candidate items are displayed. The processor 210 is further configured to control the screen to extend or retract, control the display unit 206 to display the candidate items, and display the target identifier on a second position of the screen. The first position and the second position are different.

The processor 210 is further configured to control the screen to extend, and control the display unit 206 to display a first candidate item in a case that an extension length of the screen is less than a first preset value; and control the display unit 206 to display a second candidate item in a case that the extension length of the screen is greater than the first preset value. In a case that a duration during which a length of the screen remains unchanged is greater than a second preset value, the processor 210 is further configured to control the display unit 206 to display the target interface corresponding to the target candidate item, where the target candidate item is a candidate item added to the second candidate item compared to the first candidate item.

For an electronic device with a first screen and a second screen, the processor 210 is further configured to control the second screen to extend or retract, and control to display the candidate items on the first screen and move the candidate items on the first screen, where a distance of the candidate items is related to an extension length of the second screen or a retraction length of the second screen.

The processor 210 is further configured to control the display unit 206 to display the target interface corresponding to the target candidate item in the candidate items in a case that the target candidate item overlaps a target region of the first screen.

This embodiment of the present disclosure provides an electronic device. On one hand, in a case that a target candidate item is used for unlocking, the target candidate item is obtained, and when the target candidate item matches a preset candidate item, the unlocking is finished, so that the unlocking may be finished during an expansion and retraction process of the screen, which reduces a consumed time for unlocking the electronic device with the retractable flexible screen, and increases the unlocking fun. On the other hand, in a case that the target candidate item is used for indicating an entry of an application or a shortcut function, after the target candidate item is obtained, an application interface or a shortcut function interface corresponding to the target candidate item may be started, so that a function of entering the application interface during an extension process of the first screen may be implemented, which reduces a consumed time for starting an application of the electronic device with the flexible screen, and increases the fun, thereby improving user experience.

It is to be understood that, in this embodiment of the present disclosure, the radio frequency unit 201 may be configured to transmit and receive information or transmit and receive signals during a call. Specifically, the radio frequency unit 201 is configured to receive downlink data from a base station and transmit downlink data to the processor 210 for processing. In addition, the radio frequency unit 201 transmits uplink data to the base station. Generally, the radio frequency unit 201 includes, but is not limited to, an antenna, at least one amplifier, a transceiver, a coupler, a low noise amplifier, a duplexer, and the like. In addition, the radio frequency unit 201 may further communicate with another device through a wireless communication system and a network.

The electronic device provides wireless broadband Internet access for a user by using the network module 202, for example, allowing the user to send and receive emails, browse webpages, access streaming media content, and the like.

The audio output unit 203 may convert audio data received by the radio frequency unit 201 or the network module 202 or stored on the memory 209 into audio signals and output the audio signals as sounds. In addition, the audio output unit 203 may further provide audio output (for example, a call signal reception sound or a message reception sound) related to a specific function performed by the electronic device 200. The audio output unit 203 includes a speaker, a buzzer, a receiver, and the like The input unit 204 is configured to receive an audio or video signal. The input unit 204 may include a graphics processing unit (GPU) 2041 and a microphone 2042. The graphics processing unit 2041 performs processing on image data of a static picture or a video acquired by an image acquisition device (for example, a camera) in a video acquisition mode or an image acquisition mode. The processed image frame can be displayed on the display unit 206. An image frame processed by the graphics processing unit 2041 may be stored in the memory 209 (or another storage medium) or sent by using the radio frequency unit 201 or the network module 202. The microphone 2042 may receive a sound and can process such a sound into audio data. The processed audio data may be converted, in a phone call mode, into a format that may be sent by the radio frequency unit 201 to a mobile communication base station.

The electronic device 200 further includes at least one sensor 205 such as an optical sensor, a motion sensor, or another sensor. Specifically, the optical sensor includes an ambient light sensor and a proximity sensor. The ambient light sensor may adjust luminance of a display panel 2061 according to brightness of the ambient light. The proximity sensor may switch off the display panel 2061 and/or backlight when the electronic device 200 is moved to the ear. As a type of motion sensor, an acceleration sensor can detect magnitudes of accelerations in various directions (generally, on three axes), may detect a magnitude and a direction of the gravity in a static state, and may be applied to recognizing an altitude of the electronic device (for example, switching between a landscape state and a portrait state, a related game, and magnetometer attitude calibration), a function related to vibration recognition (such as a pedometer and a knock), and the like. The sensor 205 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 206 is configured to display information inputted by the user or information provided for the user. The display unit 206 may include a display panel 2061. The display panel 2061 may be configured in the form of a liquid crystal display (LCD), an organic light-emitting diode (OLED), or the like.

The user input unit 207 may be configured to receive input digit or character information, and generate a keyboard signal input related to the user setting and function control of the electronic device. Specifically, the user input unit 207 includes a touch panel 2071 and another input device 2072. The touch panel 2071, which is also referred to as a touch screen, may collect a touch operation of the user on or near the touch panel (for example, an operation of the user on or near the touch panel 2071 by using any suitable object or attachment, such as a finger or a stylus). The touch panel 2071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 210. In addition, the touch controller receives a command transmitted by the processor 210 and executes the command. In addition, the touch panel 2071 may be implemented by using various types, such as a resistive type, a capacitance type, an infrared type, and a surface acoustic wave type. In addition to the touch panel 2071, the user input unit 207 may further include the another input device 2072. Specifically, the another input device 2072 may include, but is not limited to, a physical keyboard, a functional key (for example, a volume control key or a switch key), a track ball, a mouse, and a joystick, and the details will not be described herein again.

Further, the touch panel 2071 may cover the display panel 2061. After detecting a touch operation on or near the touch panel, the touch panel 2071 transfers the touch operation to the processor 210, to determine a type of a touch event. Then, the processor 210 provides a corresponding visual output on the display panel 2061 according to the type of the touch event. In FIG. 11, the touch panel 2071 and the display panel 2061 implement, as two independent parts, input and output functions of the electronic device. However, in some embodiments, the touch panel 2071 and the display panel 2061 may be integrated to implement the input and output functions of the electronic device. The details are not limited herein.

The interface unit 208 is an interface for connecting an external apparatus and the electronic device 200. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 208 may be configured to receive inputs (for example, data information, or power) from the external apparatus and transmit the received input to one or more elements in the electronic device 200, or may be configured to transmit data between the electronic device 200 and the external apparatus.

The memory 209 may be configured to store a software program and various data. The memory 209 may mainly include a program storage area and a data storage area. The program storage area may store an operating system, an application required by at least one function (for example, a sound playback function and an image display function), and the like. The data storage area may store data (for example, audio data and a phone book) created according to the use of the mobile phone. In addition, the memory 209 may include a high speed random access memory, and may further include a non-volatile memory, such as at least one magnetic disk storage device, a flash memory, or another non-volatile solid state storage device.

The processor 210 is a control center of the electronic device, and connects to various parts of the electronic device by using various interfaces and lines. By running or executing the software program and/or module stored in the memory 209, and invoking data stored in the memory 209, the processor performs various functions and data processing of the electronic device, thereby performing overall monitoring on the electronic device. Optionally, the processor 210 may include one or more processing units. Optionally, the processor 210 may integrate an application processor and a modem processor, where the application processor mainly processes an operating system, a user interface, an application program, and the like, and the modem processor mainly processes wireless communication. It may be understood that the modem processor may alternatively not be integrated into the processor 210.

The electronic device 200 further includes a power supply 211 (such as a battery) for supplying power to the components. Optionally, the power supply 211 may be logically connected to the processor 210 by using a power management system, thereby implementing functions such as charging, discharging, and power consumption management by using the power management system.

In addition, the electronic device 200 includes some functional module that are not shown, which are not described herein in detail.

Optionally, the embodiments of the present disclosure further provide an electronic device, including a processor 210, a memory 209, and a computer program shown in FIG. 11, where the computer program is stored in the memory 209 and runnable on the processor 210. The computer program, when executed by the processor 210, implements each process of the foregoing method embodiment, and same technical effects can be achieved. To avoid repetition, the details are not described herein again.

The embodiments of the present disclosure further provide a computer-readable storage medium, storing a computer program. The computer program, when executed by a processor, implements each process of the foregoing method embodiments, and the same technical effect can be achieved. To avoid repetition, the details are not described herein again. The computer-readable storage medium is, for example, a read-only memory (ROM), a random access memory (RAM), a magnetic disk, or an optical disk.

It is to be noted that the term "comprise", "include" or any other variation thereof in this specification is intended to cover a non-exclusive inclusion, so that a process, method, object or apparatus including a series of elements not only includes those elements, but also includes other elements not clearly listed or includes intrinsic elements for the process, method, object or apparatus. Without more limitations, elements defined by a sentence "including a . . . " does not exclude that there are still other same elements in the process, method, object, or apparatus.

Through the descriptions of the foregoing implementations, a person skilled in the art may clearly understand that the method according to the foregoing embodiments may be implemented by software and a necessary general hardware platform, and may alternatively be implemented by hardware, but in many cases, the former manner is a better implementation. Based on such understanding, the technical solutions of the present disclosure essentially, or the part contributing to the related art, may be presented in the form of a software product. The computer software product is stored in a storage medium (such as a ROM/RAM, a magnetic disk, or an optical disk), including several instructions to enable a terminal (which may be a mobile phone, a computer, a server, an air conditioner, or a network device) to perform the methods described in the embodiments of the present disclosure.

The embodiments of the present disclosure are described above with reference to the accompanying drawings, but the present disclosure is not limited to the foregoing specific embodiments, which are merely illustrative rather than limited. Under the inspiration of the present disclosure, a person of ordinary skill in the art can make many forms without departing from the scope of the present disclosure and the protection of the claims, all of which fall within the protection of the present disclosure.

What is claimed is:

1. A display method, applied to an electronic device, wherein the electronic device comprises a screen retractable in length or width; the method comprising:
   receiving a first input;
   controlling the screen to extend or retract and displaying a candidate item in response to the first input; and
   displaying a target interface corresponding to a target candidate item in the candidate item in a case that the target candidate item meets a preset condition;
   wherein before the displaying a target interface corresponding to a target candidate item in the candidate item in a case that the target candidate item meets a preset condition, the method comprises:
   displaying a target identifier; and
   the displaying a target interface corresponding to a target candidate item in the candidate item in a case that the target candidate item meets a preset condition comprises:
   displaying the target interface corresponding to the target candidate item in the candidate item in a case that the target identifier at least partially overlaps the target candidate item;

wherein the displaying a target identifier comprises:
displaying the target identifier on a first position of the screen before the controlling the screen to extend or retract and displaying a candidate item in response to the first input; and
the controlling the screen to extend or retract and displaying a candidate item comprises:
controlling the screen to extend or retract, displaying the candidate item, and displaying the target identifier on a second position of the screen,
wherein the first position and the second position are different.

2. The method according to claim 1, wherein the controlling the screen to extend and displaying a candidate item comprises:
controlling the screen to extend;
displaying a first candidate item in a case that an extension length of the screen is less than a first preset value; and
displaying a second candidate item in a case that the extension length of the screen is greater than the first preset value; and
the displaying a target interface corresponding to a target candidate item in the candidate item in a case that the target candidate item meets a preset condition comprises:
displaying the target interface corresponding to the target candidate item in a case that a duration during which a length of the screen remains unchanged is greater than a second preset value, wherein the target candidate item is a candidate item added to the second candidate item compared to the first candidate item.

3. An electronic device, comprising a processor, a memory, and a computer program stored in the memory and runnable in the processor, wherein the computer program, when executed by the processor, causes the electronic device to perform:
receiving a first input;
controlling the screen to extend or retract and displaying a candidate item in response to the first input; and
displaying a target interface corresponding to a target candidate item in the candidate item in a case that the target candidate item meets a preset condition;
wherein the computer program, when executed by the processor, causes the electronic device to further perform:
displaying a target identifier; and
displaying the target interface corresponding to the target candidate item in the candidate item in a case that the target identifier at least partially overlaps the target candidate item;
wherein the displaying a target identifier comprises:
displaying the target identifier on a first position of the screen before the controlling the screen to extend or retract and displaying a candidate item in response to the first input; and
the controlling the screen to extend or retract and displaying a candidate item comprises:
controlling the screen to extend or retract, displaying the candidate item, and displaying the target identifier on a second position of the screen,
wherein the first position and the second position are different.

4. The electronic device according to claim 3, wherein the computer program, when executed by the processor, causes the electronic device to further perform:
controlling the screen to extend;
displaying a first candidate item in a case that an extension length of the screen is less than a first preset value; and
displaying a second candidate item in a case that the extension length of the screen is greater than the first preset value; and
displaying the target interface corresponding to the target candidate item in a case that a duration during which a length of the screen remains unchanged is greater than a second preset value, wherein the target candidate item is a candidate item added to the second candidate item compared to the first candidate item.

5. A non-transitory computer-readable storage medium, storing a computer program, wherein the computer program, when executed by a processor, causes the processor to perform:
receiving a first input;
controlling the screen to extend or retract and displaying a candidate item in response to the first input; and
displaying a target interface corresponding to a target candidate item in the candidate item in a case that the target candidate item meets a preset condition;
wherein the computer program, when executed by a processor, causes the processor to further perform:
displaying a target identifier; and
the displaying a target interface corresponding to a target candidate item in the candidate item in a case that the target candidate item meets a preset condition comprises:
displaying the target interface corresponding to the target candidate item in the candidate item in a case that the target identifier at least partially overlaps the target candidate item;
wherein the displaying a target identifier comprises:
displaying the target identifier on a first position of the screen before the controlling the screen to extend or retract and displaying a candidate item in response to the first input; and
the controlling the screen to extend or retract and displaying a candidate item comprises:
controlling the screen to extend or retract, displaying the candidate item, and displaying the target identifier on a second position of the screen,
wherein the first position and the second position are different.

6. The non-transitory computer-readable storage medium according to claim 5, wherein the computer program, when executed by a processor, causes the processor to further perform:
controlling the screen to extend;
displaying a first candidate item in a case that an extension length of the screen is less than a first preset value; and
displaying a second candidate item in a case that the extension length of the screen is greater than the first preset value; and
displaying the target interface corresponding to the target candidate item in a case that a duration during which a length of the screen remains unchanged is greater than a second preset value, wherein the target candidate item is a candidate item added to the second candidate item compared to the first candidate item.

* * * * *